(12) United States Patent
Quinn et al.

(10) Patent No.: US 7,412,689 B1
(45) Date of Patent: Aug. 12, 2008

(54) METHOD AND APPARATUS FOR CREATING A HIERARCHICAL MODEL TO FACILITATE IDENTIFYING COMPONENTS IN A PROGRAMMING LANGUAGE FILE

(75) Inventors: Carl E. Quinn, San Jose, CA (US); Torbjorn Norbye, Concord, CA (US); Joseph Paul Nuxoll, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 548 days.

(21) Appl. No.: 10/877,523

(22) Filed: Jun. 25, 2004

(51) Int. Cl.
*G06F 9/44* (2006.01)

(52) U.S. Cl. .................................................. 717/107
(58) Field of Classification Search ................ 717/125, 717/110, 107, 100
See application file for complete search history.

(56) References Cited

U.S. PATENT DOCUMENTS 6,574,790 B1 * 6/2003 Abramson et al. .......... 717/100
6,792,595 B1 * 9/2004 Storistenau et al. ......... 717/110
7,246,134 B1 * 7/2007 Kitain et al. ................ 707/102
2003/0088643 A1 * 5/2003 Shupps et al. .............. 709/218

OTHER PUBLICATIONS

Champion et. al., "Document Object Model (HTML) Level 1", Oct. 1, 1998, REC-DOM-Level-1-19981001, pp. 1, 6, 7.*
McClanahan et. al., "JavaServer Faces Specification: Version 1.1", Feb. 2004, Sun Microsystems, Inc., Revision 1, pp. 1-7, 1-8, 3-2, 3-6, 6-10.*
Shelley Doll, "Zend Encoder safeguards your PHP Source", Apr. 2002.*

* cited by examiner

*Primary Examiner*—Wei Y. Zhen
*Assistant Examiner*—Philip R. Wang
(74) *Attorney, Agent, or Firm*—Park, Vaughan & Fleming LLP

(57) ABSTRACT

One embodiment of the present invention provides a system that facilitates creating a hierarchical model from a programming language file that includes components. The system operates by obtaining a component from the programming language file. Upon obtaining the component, the system passes an encoder to the component and requests that the component encode itself using the encoder, thereby causing the encoder to generate elements in the hierarchical model. Each element includes an attribute that identifies the component, thereby allowing the component to be subsequently identified by referencing the attribute in the corresponding element in the hierarchical model.

27 Claims, 4 Drawing Sheets

JSF SOURCE FILE 100

```
<h:panelGrid>
    <h:commandButton value="Submit"/>
</h:panelGrid>
```

FIG. 1A
(PRIOR ART)

JSF RENDERED HTML 110

```
<table>
  <tbody>
    <tr>
      <td>
        <input type="submit" value="Submit"/>
      </td>
    </tr>
  </tbody>
</table>
```

FIG. 1B
(PRIOR ART)

METHOD AND APPARATUS FOR CREATING A HIERARCHICAL MODEL TO FACILITATE IDENTIFYING COMPONENTS IN A PROGRAMMING LANGUAGE FILE

BACKGROUND

1. Field of the Invention

The present invention relates to tools for developing applications for an application server. More specifically, the present invention relates to a method and an apparatus that facilitates creating a hierarchical model from a programming language file that contains components, in a manner that allows the components to be subsequently identified by referencing the hierarchical model.

2. Related Art

The rapid proliferation of computer technology in recent years has been facilitated by significant advances in the design of user interfaces, which have made computer programs significantly easier to use. As these user interfaces become increasingly more sophisticated, a significantly larger percentage of an application developer's time is dedicated to developing user interfaces. This development process typically involves tedious and time-consuming manipulations of the various graphical components that comprise a user interface.

A number of tools have been developed to simplify the process of developing user interfaces. Some of these tools provide a WYSIWYG (What You See Is What You Get) editor, which allows an application developer to manipulate the graphical components that comprise a user interface.

It is difficult to build a WYSIWYG design tool that allows a user to manipulate a component in the WYSIWYG view and to make corresponding changes to the associated component in the source file. This is especially true for JavaServer Faces (JSF) components in situations where a component is embedded within another component. In this situation, a component is free to replicate a subcomponent's rendered HyperText Markup Language (HTML) or ignore it altogether. For example, a "tabbed window" JSF component will render exactly one of its children—the one corresponding to the selected tab. In general, given a JSF component hierarchy, it is difficult to determine which portions of the HTML correspond to which individual components in the hierarchy.

The following example illustrates this problem. Consider the block of code in JSF source file 100, illustrated in FIG. 1A. When this block of code is rendered using JSF's render kit, corresponding JSF-rendered HyperText Markup Language (HTML) 110 is produced as is illustrated in FIG. 1B. In FIG. 1B, the bold line <input type="submit" value="Submit"/> corresponds to the bold line <h:commandButton value="Submit"/> from JSF source file 100. Everything else in JSF-rendered HTML 110 comes from the <h:panelGrid> component from JSF source file 100.

While the system can compute the HTML stream to render at design time, the challenge is being able to identify which portions of the HTML correspond to specific individual components in the source file, without having any special knowledge of the individual components and what HTML they generate. It is important to be able to do this in a development tool. For example, if a user clicks on the button (rendered from the <input type="submit" value="Submit"/> tag above), the corresponding <h:commandButton value="Submit"/> component is selected and its properties are displayed in a property sheet in the development tool. In order to accomplish this, the system needs to determine which HTML elements from JSF rendered HTML 110 correspond to which components in JSF source file 100 as illustrated in FIG. 1C.

Hence, what is needed is a method and an apparatus for identifying components in a source file that generated a markup stream in a markup file.

SUMMARY

One embodiment of the present invention provides a system that facilitates creating a hierarchical model from a programming language file that includes components. The system operates by obtaining a component from the programming language file. Upon obtaining the component, the system passes an encoder to the component and requests that the component encode itself using the encoder, thereby causing the encoder to generate elements in the hierarchical model. Each element includes an attribute that identifies the component, thereby allowing the component to be subsequently identified by referencing the attribute in the corresponding element in the hierarchical model.

In a variation on this embodiment, the programming language file is a JavaServer Pages file.

In a variation on this embodiment, the component is a JavaServer Faces Component.

In a further variation, the encoder is the JavaServer Faces ResponseWriter.

In a variation on this embodiment, the system renders a markup language file from the programming language file, wherein markup language components in the markup language file correspond to elements in the hierarchical model. The system then uses the hierarchical model to associate markup language components with components from the programming language file.

In a further variation, the system uses the hierarchical model in an integrated development environment.

In a variation on this embodiment, the markup language is a form of HTML.

In a further variation, the markup language is XHTML.

In a variation on this embodiment, the hierarchical model is a Document Object Model.

BRIEF DESCRIPTION OF THE FIGURES

FIG. 1A illustrates a code block from a JavaServer Faces Source File.

FIG. 1B illustrates an HTML block from a JavaServer Faces rendered HTML file.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), but does not include computer instruction signals embodied in a transmission medium (with or without a carrier wave upon which the signals are modulated).

DOM Writer

Figure 1C:
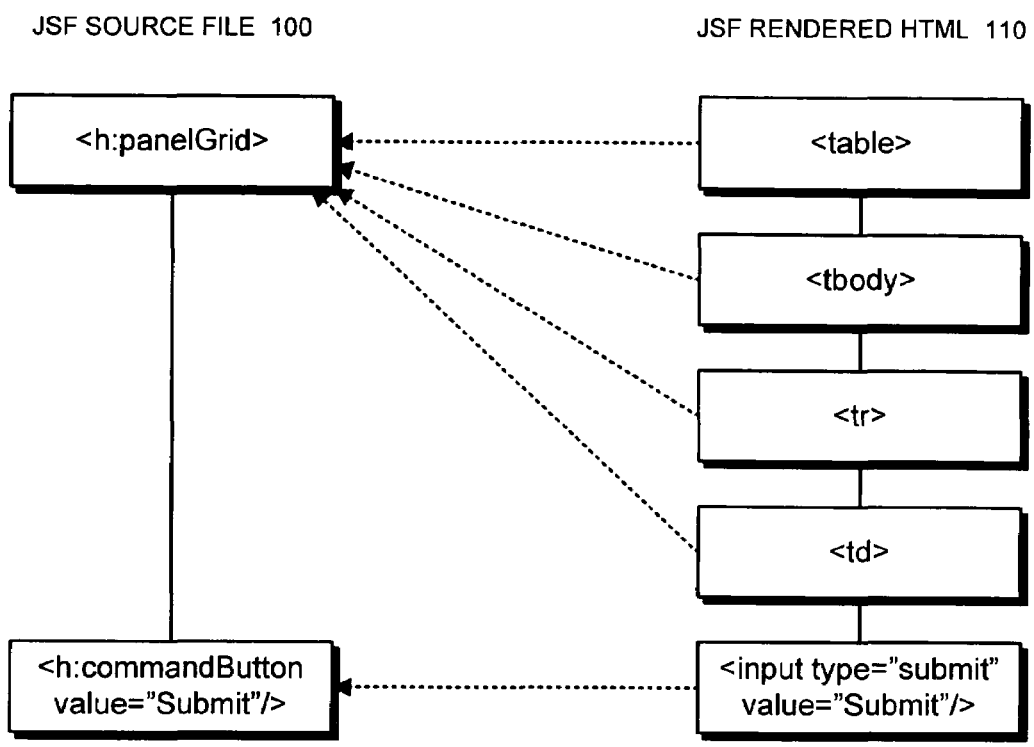
FIG. 1C illustrates associations between a JavaServer Faces Source File and a JavaServer Faces rendered HTML file in accordance with an embodiment of the present invention.
Figure 2:
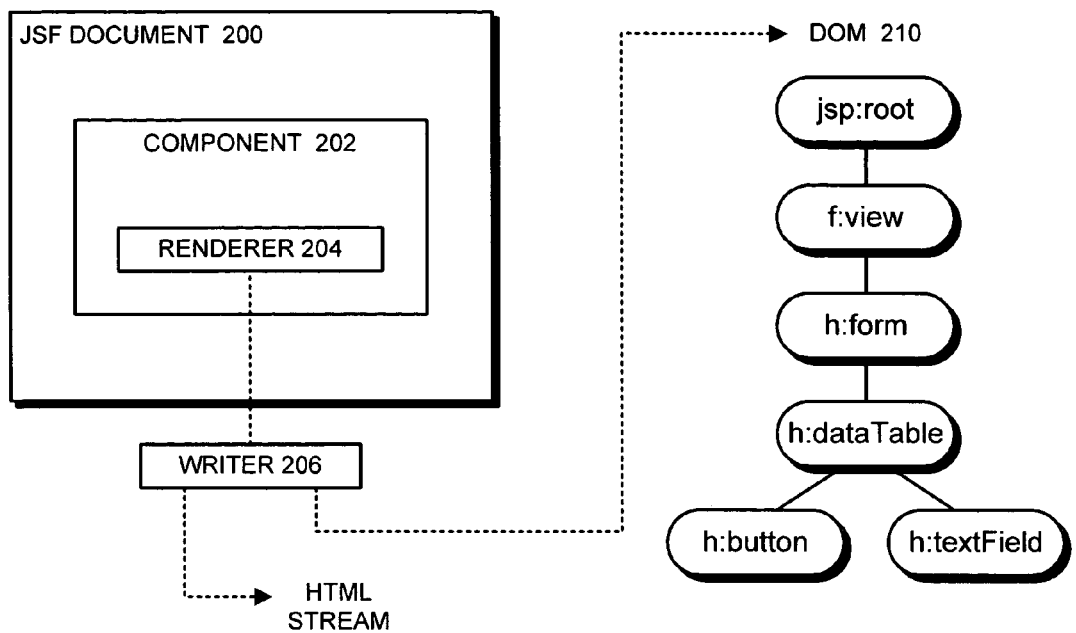
FIG. 2 illustrates Document Object Model writer 206 in accordance with an embodiment of the present invention.

FIG. 2 illustrates Document Object Model (DOM) writer 206 in accordance with an embodiment of the present invention. (The current DOM specification can be found at http://www.w3.org/DOM) JavaServer Faces (JSF) provides a HyperText Markup Language (HTML) encoding scheme where each component, such as component 202 in JSF document 200, has a corresponding HTML renderer, such as renderer 204. Renderer 204 looks at component 202 and emits HTML according to the properties and children of component 202. Component 202 is able to accomplish this by calling into a special component writer defined by JSF Oavaxfaces.context.ResponseWriter) to output the actual HTML content on its behalf. Note that this was done to ensure that the HTML is well formed (attribute values are properly escaped and so forth.) However, one embodiment of the present invention replaces an original JSF writer to solve the problem described above.

In this embodiment, the original JSF writer is replaced with a new ResponseWriter implementation, writer 206. Component 202 is then asked to encode itself by calling back to writer 206. Writer 206 builds up DOM 210 directly in memory to represent component 202, instead of generating HTML text as was intended. For example, when component 202 calls startTag("table"), writer 206 creates a new DOM Element in DOM 210 and assign it the tag "table". When component 202 calls writeAttribute("border", "0"), writer 206 translates this into currentElement.setAttribute("border", "0"), and so forth.

However, DOM 210 also has some additional fields per element that are set in the current embodiment. In particular, in writer 206's startElement( ) method, the system determines which UIComponent is currently being rendered, and stores that in DOM 210 right with the Element. This way, the end result is a DOM Document which not only has all the HTML elements and text nodes generated from the component, but it also has a reference for each element back to which JSF component the given tag corresponds to. With this information, a page designer, when rendering the HTML document, can also handle user interaction with the components. If a user clicks on a part of the display, the corresponding HTML for that mouse click is consulted, and the component reference is looked up in DOM 210. The net result is that the system can select the right JSF component for the mouse click, and display its properties in the property descriptor, or apply a tool action like "copy" or "move" or "delete" to the right component.

Note that for purposes of illustration, JSF, HTML, and DOM are used. However, the invention is not meant to be limited to JSF, HTML, and DOM. In general, any types of programming languages, markup languages, and hierarchical models may be used.

Creating a Document Object Model

Figure 3:
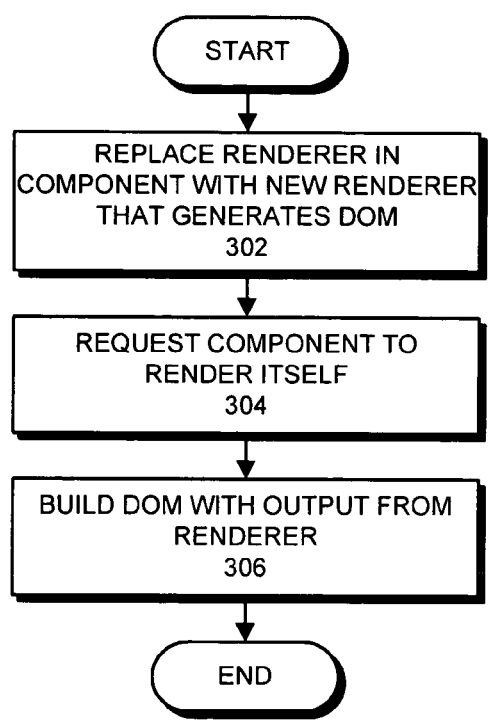
FIG. 3 presents a flowchart illustrating the process of creating a Document Object Model in accordance with an embodiment of the present invention.

FIG. 3 presents a flowchart illustrating the process of creating Document Object Model 210 in accordance with an embodiment of the present invention. The system starts by replacing an original JSF writer associated with component 202 with writer 206, wherein writer 206 renders elements in DOM 210 rather than HTML (step 302).

Next, the system requests component 202 to render itself (step 304). When component 202 invokes writer 206, writer 206 generates elements in DOM format. These elements include additional attributes that indicate the component that generated them. For example, given a component named "button1", each element generated in DOM 210 could include an attribute called "binding" with a property of "button1". As each component invokes writer 206 to generate corresponding DOM elements, the system assembles these elements into DOM 210 (step 306).

Identifying Components with a Document Object Model

Figure 4:
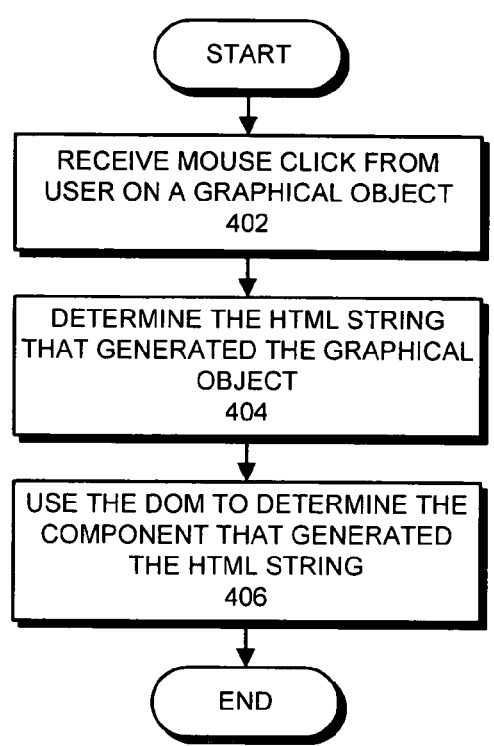
FIG. 4 presents a flowchart illustrating the process of identifying a component that generated HTML using the Document Object Model in accordance with an embodiment of the present invention.

FIG. 4 presents a flowchart illustrating the process of identifying a component that generated HTML using Document Object Model 210 in accordance with an embodiment of the present invention. In the context of a developer tool, it is important when a user is manipulating graphical objects in a WYSIWYG (What You See Is What You Get) editor for the editor to make modifications to the appropriate component. DOM 210 can be used as a lookup map to determine which components generated which sections of the HTML code and corresponding graphical objects.

The system starts when it receives a mouse click from a user on a graphical object, such as a command button or a form field (step 402). Next, the system determines which part of the HTML file generated the graphical object that the user is interacting with (step 404). Finally, the system uses DOM 210 to determine the component that generated the HTML that created the graphical object (step 406). This is accomplished by locating the element in DOM 210 that corresponds to the graphical object, and reading the value of a special attribute attached to the element that indicates the ID of the corresponding generating component.

This embodiment represents a marked improvement over existing developer tools in that it provides a quick and accurate mapping from the generated HTML back to the generating components. DOM 210 is generated quickly and accurately from the components themselves, and facilitates this backward mapping. Existing tools cannot perform this mapping. Hence, if any existing tool tries to render a custom component which has been selected in a user interface, the existing tool will not be able to render the custom component, but instead will represent the custom component with some sort of reserved space to indicate that it could create a graphical object for the custom component in the area indicated by the reserved space.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A process for creating a hierarchical model from a programming language file that includes components, wherein the process is executed by a computer system, the process comprising:

obtaining a component from the programming language file wherein the component has a first corresponding renderer that generates output according to the properties and children of the component;

replacing the first corresponding renderer with a second corresponding renderer;

passing the second corresponding renderer to the component; and requesting the component to encode itself using the second corresponding renderer, thereby causing the second corresponding renderer to generate elements in the hierarchical model;

wherein each element includes an attribute that identifies the component, thereby allowing the component to be subsequently identified by referencing the attribute in the corresponding element in the hierarchical model.

2. The process of claim 1, wherein the programming language file is a JavaServer Pages file.

3. The process of claim 1, wherein the component is a JavaServer Faces Component.

4. The process of claim 3, wherein the first corresponding renderer and the second corresponding renderer are JavaServer Face ResponseWriters.

5. The process of claim 1, further comprising:

rendering a markup language file from the programming language file, wherein markup language components in the markup language file correspond to elements in the hierarchical model; and using the hierarchical model to associate markup language components with components from the programming language file.

6. The process of claim 5, further comprising using the hierarchical model in an integrated development environment.

7. The process of claim 5, wherein the markup language is a form of HTML.

8. The process of claim 7, wherein the markup language is XHTML.

9. The process of claim 1, wherein the hierarchical model is a Document Object Model.

10. A computer-readable storage medium storing instructions that when executed by a computer cause the computer to perform a method for creating a hierarchical model from a programming language file that includes components, the method comprising:

obtaining a component from the programming language file wherein the component has a first corresponding renderer that generates output according to the properties and children of the component;

replacing the first corresponding renderer with a second corresponding renderer;

passing the second corresponding renderer to the component; and requesting the component to encode itself using the second corresponding renderer, thereby causing the second corresponding renderer to generate elements in the hierarchical model;

wherein each element includes an attribute that identifies the component, thereby allowing the component to be subsequently identified by referencing the attribute in the corresponding element in the hierarchical model.

11. The computer-readable storage medium of claim 10, wherein the programming language file is a JavaServer Pages file.

12. The computer-readable storage medium of claim 10, wherein the component is a JavaServer Faces Component.

13. The computer-readable storage medium of claim 12, wherein the first corresponding renderer and the second corresponding renderer are JavaServer Face ResponseWriters.

14. The computer-readable storage medium of claim 10, wherein the method further comprises:

rendering a markup language file from the programming language file, wherein markup language components in the markup language file correspond to elements in the hierarchical model; and using the hierarchical model to associate markup language components with components from the programming language file.

15. The computer-readable storage medium of claim 14, wherein the method further comprises using the hierarchical model in an integrated development environment.

16. The computer-readable storage medium of claim 14, wherein the markup language is a form of HTML.

17. The computer-readable storage medium of claim 16, wherein the markup language is XHTML.

18. The computer-readable storage medium of claim 10, wherein the hierarchical model is a Document Object Model.

19. An apparatus that creates a hierarchical model from a programming language file that includes components, comprising:

a memory;

an obtaining mechanism configured to obtain a component from the programming language file wherein the component has a first corresponding renderer that generates output according to the properties and children of the component;

a replacing mechanism to replace the first corresponding renderer with a second corresponding renderer;

a passing mechanism configured to pass the second corresponding renderer to the component; and a requesting mechanism configured to request the component to encode itself using the second corresponding renderer, thereby causing the second corresponding renderer to generate elements in the hierarchical model;

wherein each element includes an attribute that identifies the component, thereby allowing the component to be subsequently identified by referencing the attribute in the corresponding element in the hierarchical model; and wherein the hierarchical model is stored in the memory.

20. The apparatus of claim 19, wherein the programming language file is a JavaServer Pages file.

21. The apparatus of claim 19, wherein the component is a JavaServer Faces Component.

22. The apparatus of claim 21, wherein the first corresponding renderer and the second corresponding renderer are JavaServer Face ResponseWriters.

23. The apparatus of claim 19, further comprising:

a rendering mechanism configured to render a markup language file from the programming language file, wherein markup language components in the markup language file correspond to elements in the hierarchical model; and an association mechanism configured to use the hierarchical model to associate markup language components with components from the programming language file.

24. The apparatus of claim 23, wherein the association mechanism is further configured to use the hierarchical model in an integrated development environment.

25. The apparatus of claim 23, wherein the markup language is a form of HTML.

26. The apparatus of claim 25, wherein the markup language is XHTML.

27. The apparatus of claim 19, wherein the hierarchical model is a Document Object Model.

* * * * *